United States Patent
Akiyama et al.

(10) Patent No.: US 12,453,100 B2
(45) Date of Patent: Oct. 21, 2025

(54) MAGNETIC MEMORY DEVICE

(71) Applicant: Kioxia Corporation, Tokyo (JP)

(72) Inventors: Naoki Akiyama, Seoul (KR); Kenichi Yoshino, Seongnam-si (KR); Kazuya Sawada, Seoul (KR); Hyungjun Cho, Seoul (KR); Takuya Shimano, Seoul (KR)

(73) Assignee: Kioxia Corporation, Tokyo (JP)

( * ) Notice: Subject to any disclaimer, the term of this patent is extended or adjusted under 35 U.S.C. 154(b) by 523 days.

(21) Appl. No.: 17/943,160

(22) Filed: Sep. 12, 2022

(65) Prior Publication Data

US 2023/0292529 A1    Sep. 14, 2023

(30) Foreign Application Priority Data

Mar. 11, 2022 (JP) .................................. 2022-038150

(51) Int. Cl.
*H10B 61/00* (2023.01)
*H10N 50/01* (2023.01)
*H10N 50/80* (2023.01)

(52) U.S. Cl.
CPC ............. *H10B 61/10* (2023.02); *H10N 50/01* (2023.02); *H10N 50/80* (2023.02)

(58) Field of Classification Search
CPC ........ H10B 61/10; H10B 61/00; H10N 50/01; H10N 50/80; H10N 50/10
See application file for complete search history.

(56) References Cited

U.S. PATENT DOCUMENTS

| | | |
|---|---|---|
| 10,217,934 B2 | 2/2019 | Yang et al. |
| 10,304,509 B2 | 5/2019 | Yoshikawa et al. |
| 2020/0075851 A1* | 3/2020 | Karpov ................. H10B 63/24 |
| 2020/0091411 A1 | 3/2020 | Sonoda |
| 2021/0036221 A1 | 2/2021 | Ohba et al. |
| 2021/0074911 A1 | 3/2021 | Isoda et al. |

(Continued)

FOREIGN PATENT DOCUMENTS

| | | |
|---|---|---|
| JP | 2018152432 A | 9/2018 |
| TW | 201946308 A | 12/2019 |

(Continued)

OTHER PUBLICATIONS

U.S. Appl. No. 17/691,652; First Named Inventor: Kazuya Sawada; Title: "Magnetoresistance Memory Device and Manufacturing Method of Magnetoresistance Memory Device", filed Mar. 10, 2022.

(Continued)

*Primary Examiner* — Wasiul Haider
(74) *Attorney, Agent, or Firm* — Holtz, Holtz & Volek PC

(57) ABSTRACT

According to one embodiment, a magnetic memory device includes a plurality of memory cells each including a magnetoresistance effect element and a switching element provided on a lower layer side of the magnetoresistance effect element and connected in series to the magnetoresistance effect element. The switching element includes a bottom electrode, a top electrode and a switching material layer provided between the bottom electrode and the top electrode, and the top electrode includes a first portion formed of a first material and a second portion provided on a lower layer side of the first portion and formed of a second material different from the first material.

20 Claims, 4 Drawing Sheets

(56) References Cited

U.S. PATENT DOCUMENTS

| | | |
|---|---|---|
| 2021/0098530 A1 | 4/2021 | Manfrini et al. |
| 2021/0287727 A1 | 9/2021 | Tsubata et al. |
| 2021/0288240 A1 | 9/2021 | Sawada et al. |
| 2022/0020919 A1* | 1/2022 | Vellianitis ............... H10B 61/10 |
| 2022/0085103 A1 | 3/2022 | Yoshino et al. |
| 2022/0085104 A1* | 3/2022 | Park ....................... H10B 61/10 |
| 2022/0093146 A1 | 3/2022 | Akiyama et al. |
| 2022/0093847 A1 | 3/2022 | Ochiai et al. |
| 2022/0293850 A1 | 9/2022 | Akiyama et al. |

FOREIGN PATENT DOCUMENTS

| | | |
|---|---|---|
| TW | 202013675 A | 4/2020 |
| TW | 202135062 A | 9/2021 |

OTHER PUBLICATIONS

U.S. Appl. No. 17/884,790; First Named Inventor: Kazuhiro Tomioka; Title: "Memory Device and Method for Manufacturing Memory Device", filed Aug. 10, 2022.

U.S. Appl. No. 17/943,151; First Named Inventor: Kenichi Yoshino; Title: "Magnetic Memory Device", filed Sep. 12, 2022.

* cited by examiner

MAGNETIC MEMORY DEVICE

CROSS-REFERENCE TO RELATED APPLICATIONS

This application is based upon and claims the benefit of priority from Japanese Patent Application No. 2022-038150, filed Mar. 11, 2022, the entire contents of which are incorporated herein by reference.

FIELD

Embodiments described herein relate generally to a magnetic memory device.

BACKGROUND

A magnetic memory device has been proposed in which memory cells including magnetoresistance effect elements and selectors (switching elements) are integrated on a semiconductor substrate.

DETAILED DESCRIPTION

In general, according to one embodiment, a magnetic memory device includes a plurality of memory cells each including a magnetoresistance effect element and a switching element provided on a lower layer side of the magnetoresistance effect element and connected in series to the magnetoresistance effect element, wherein the switching element includes a bottom electrode, a top electrode and a switching material layer provided between the bottom electrode and the top electrode, and the top electrode includes a first portion formed of a first material and a second portion provided on a lower layer side of the first portion and formed of a second material different from the first material.

Embodiments will be described hereinafter with reference to the accompanying drawings.

Figure 1:
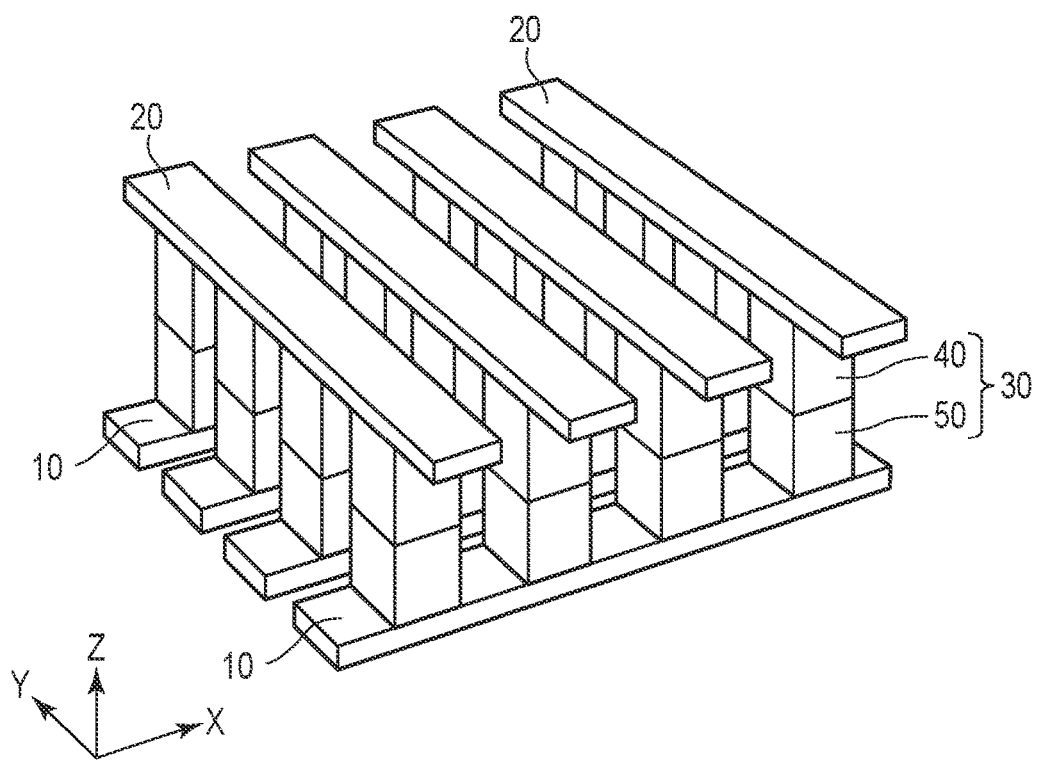
FIG. 1 is a perspective view schematically showing a magnetic memory device according to an embodiment.

FIG. 1 is a perspective view schematically showing a structure of a magnetic memory device according to an embodiment.

The magnetic memory device shown in FIG. 1 includes a plurality of first wiring lines 10 each extending in an X direction, a plurality of second wiring lines 20 each extending in the Y direction and a plurality of memory cells connected between the plurality of first wiring lines 10 and the plurality of second wiring lines 20, respectively. Note that the X, Y and Z directions are directions which intersect each other. More specifically, the X, Y, and Z directions are orthogonal to each other.

Each memory cell 30 includes a magnetoresistance effect element 40 and a selector (switching element) 50 provided on a lower layer side of the magnetoresistance effect element 40 and connected in series to the magnetoresistance effect element 40.

The first wiring lines 10 are provided on the lower layer sides of the selectors 50 and are electrically connected to the selector 50, respectively. The second wiring lines 20 are provided on the upper layer sides of the magnetoresistance effect elements 40 and are electrically connected to the magnetoresistance effect elements 40, respectively. The first wiring lines 10 corresponds to word lines, respectively and the second wiring lines 20 correspond to bit lines, or the first wiring lines 10 corresponds to bit lines, respectively and the second wiring lines 20 correspond to word lines.

Figure 2:
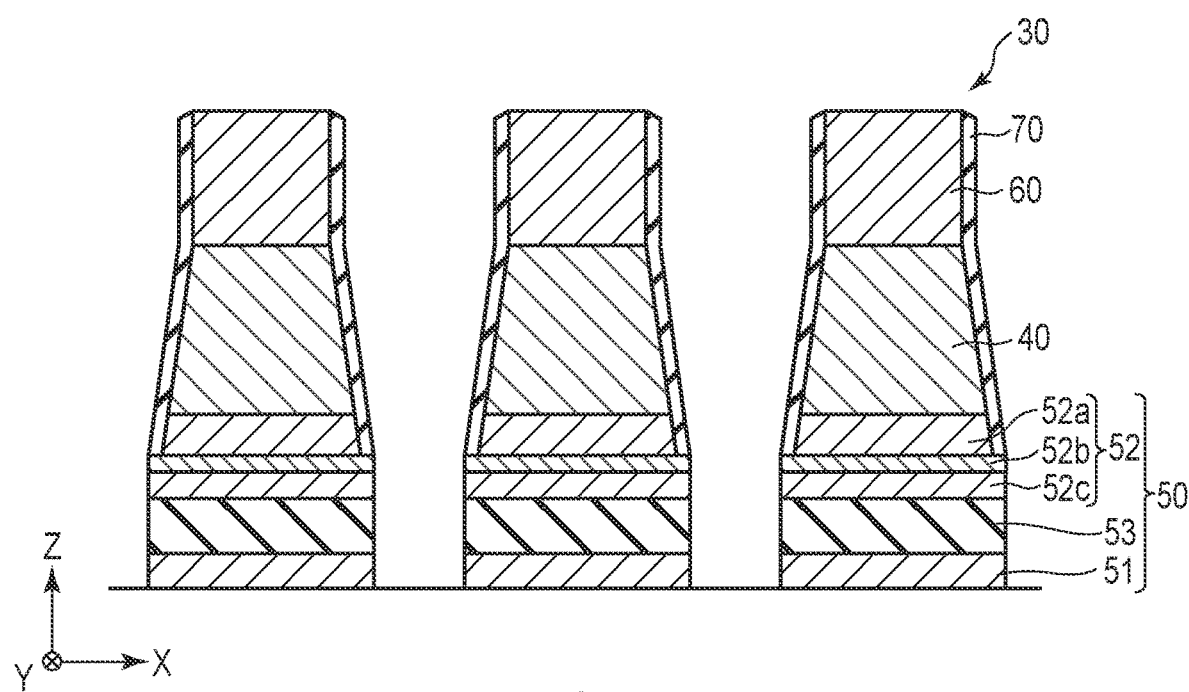
FIG. 2 is a cross-sectional view schematically showing a configuration of memory cells of the magnetic memory device according to the embodiment.

FIG. 2 is a cross-sectional view schematically showing a detailed structure of memory cells 30.

As shown in FIG. 2, each memory cell 30 includes a magnetoresistance effect element 40, a selector (switching element) 50, a hard mask layer 60 and a protective insulating layer 70.

Figure 3:
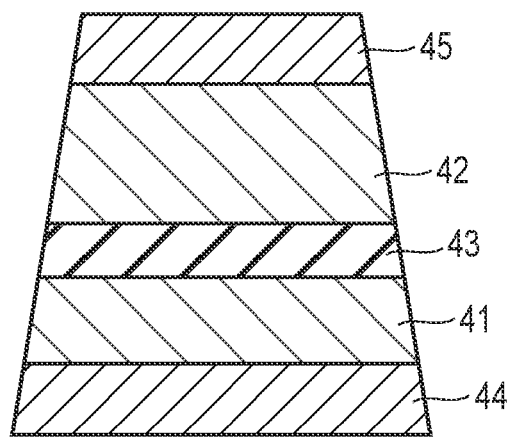
FIG. 3 is a cross-sectional view schematically showing a basic configuration of a magnetoresistance effect element of the magnetic memory device of the embodiment.

FIG. 3 is a cross-sectional view schematically showing a basic structure of the magnetoresistance effect element 40.

The magnetoresistance effect element 40 is a magnetic tunnel junction (MTJ) element and includes a storage layer (a first magnetic layer) 41, a reference layer (a second magnetic layer) 42, a tunnel barrier layer (a nonmagnetic layer) 43, a bottom electrode 44 and a top electrode 45.

The storage layer 41 is a ferromagnetic layer having a variable magnetization direction. The variable magnetization direction means that the magnetization direction varies with respect to a predetermined write current. The reference layer 42 is a ferromagnetic layer having a fixed magnetization direction. The fixed magnetization direction means that the magnetization direction does not vary with respect to a predetermined write current. The tunnel barrier layer 43 is an insulating layer provided between the storage layer 41 and the reference layer 42.

When the magnetization direction of the storage layer 41 is parallel to that of the reference layer 42, the magnetoresistance effect element 40 is in a low-resistance state where the resistance is relatively low. When the magnetization direction of the storage layer 41 is antiparallel to that of the reference layer 42, the magnetoresistance effect element 40 is in a high-resistance state where the resistance is relatively high. With this structure, the magnetoresistance effect element 40 can store binary data according to the resistance state.

The magnetoresistance effect element 40 is a spin-transfer-torque (STT) magnetoresistance effect element and has perpendicular magnetization. That is, the magnetization direction of the storage layer 41 is perpendicular to its film surface, and the magnetization direction of the reference layer 42 is perpendicular to its film surface.

Note that in the example of FIG. 3, a bottom-free magnetoresistance effect element in which the storage layer 41 is located on a lower layer side of the reference layer 42 is used, but a top-free magnetoresistance effect element in which the storage layer 41 is located on an upper layer side of the reference layer 42, may as well be used.

As shown in FIG. 2, the selector 50 includes a bottom electrode 51, a top electrode 52 and a selector material layer (a switching material layer) 53 provided between the bottom electrode 51 and the top electrode 52. The bottom electrode 51 is electrically connected to the respective first wiring line 10 shown in FIG. 1, and the top electrode 52 is electrically connected to the respective magnetoresistance effect element 40.

The selector 50 is a 2-terminal switching element and when the voltage applied between the two terminals (between the bottom electrode 51 and the top electrode 52) is a threshold voltage or higher, it shifts from an off state to an on state. That is, when the voltage applied between the two terminals is at the threshold voltage or higher, it shifts from an electrically non-conductive state to an electrically conductive state.

With the above-described structure, when voltage is applied to a memory cell 30 from the respective first wiring line 10 and the respective second wiring line 20 and the voltage applied to the selector 50 becomes equal to or higher than the threshold voltage, a current flows in the memory cell 30, thus enabling a write or a read with respect to the magnetoresistance effect element 40.

The top electrode 52 of the selector 50 includes a first portion 52a formed of a first material, a second portion 52b provided on a lower layer side of the first portion 52a and formed of a second material different from the first material, and a third portion 52c provided on a lower layer side of the second portion 52b and formed of a third material different from the second material. In other words, between the first portion 52a and the third portion 52c, the second portion 52b is provided. The top electrode 52 of the selector 50 may be shared as the bottom electrode 44 of the magnetoresistance effect element.

The etching rate of the second portion 52b with respect to ion beam etching (IBE) is lower than the etching rate of the first portion 52a to the IBE. More specifically, in the IBE employed to form the pattern of the magnetoresistance effect element 40, the etching rate for the second portion 52b is lower than the etching rate for the first portion 52a. Since the IBE is a physical etching, the hardness of the second material used for the second portion 52b is usually higher than the hardness of the first material used for the first portion 52a.

For the first material, a silicon (Si)-containing material or a hafnium (Hf)-containing material is employed. That is, the first portion 52a is formed of an Si layer (poly-Si layer), an Hf layer or the like.

For the second material, a material containing hafnium (Hf) and boron (B), a material containing tungsten (W), a material containing carbon (C), a material containing titanium (Ti) and nitrogen (N) or the like is employed. In other words, the second portion 52b is formed from an HfB layer, a W layer, a C layer, TiN layer or the like.

For the third material, a material containing titanium (Ti) and nitrogen (N), a material containing carbon (C), a material containing aluminum (Al) or the like is employed. That is, the third portion 52c is formed from a TiN layer, a C layer, an Al layer or the like.

For the selector material layer 53, a material containing silicon (Si), oxygen (O) and arsenic (As) is employed. More specifically, for the selector material layer 53, an As-containing silicon oxide ($SiO_2$) or the like is employed.

For the bottom electrode 51 of the selector 50, a TiN layer containing titanium (Ti) and nitrogen (N), or the like is employed.

The hard mask layer 60 is provided on the magnetoresistance effect element 40 and functions as a mask for etching when forming the magnetoresistance effect element 40 by IBE. The hard mask layer 60 is electrically connected to the respective second wiring lines 20 shown in FIG. 1.

The protective insulating layer 70 is formed, for example, from a silicon nitride containing silicon (Si) and nitrogen (N). The protective insulating layer 70 is provided along a side surface of the magnetoresistance effect element 40, a side surface of the first portion 52a of the top electrode 52 of the selector 50, and a side surface of the hard mask layer 60, so as to cover these side surfaces.

Note that the protective insulating layer 70 is provided on an upper layer side of the second portion 52b of the top electrode 52 of the selector 50, and therefore side surfaces of the second portion 52b, the third portion 52c and the like of the top electrode 52 are not covered.

Further, the position of a lower end of the protective insulating layer 70 coincides with the position of an upper surface of the second portion 52b of the top electrode 52. Therefore, the positions, in a height direction, of the lower ends of the protective insulating layers 70 contained in the respective memory cells 30 are aligned with each other.

Next, a method of manufacturing the magnetic memory device according to this embodiment will be described with reference to cross-sectional views shown in FIGS. 4 through 7 and FIG. 2.

Figure 4:
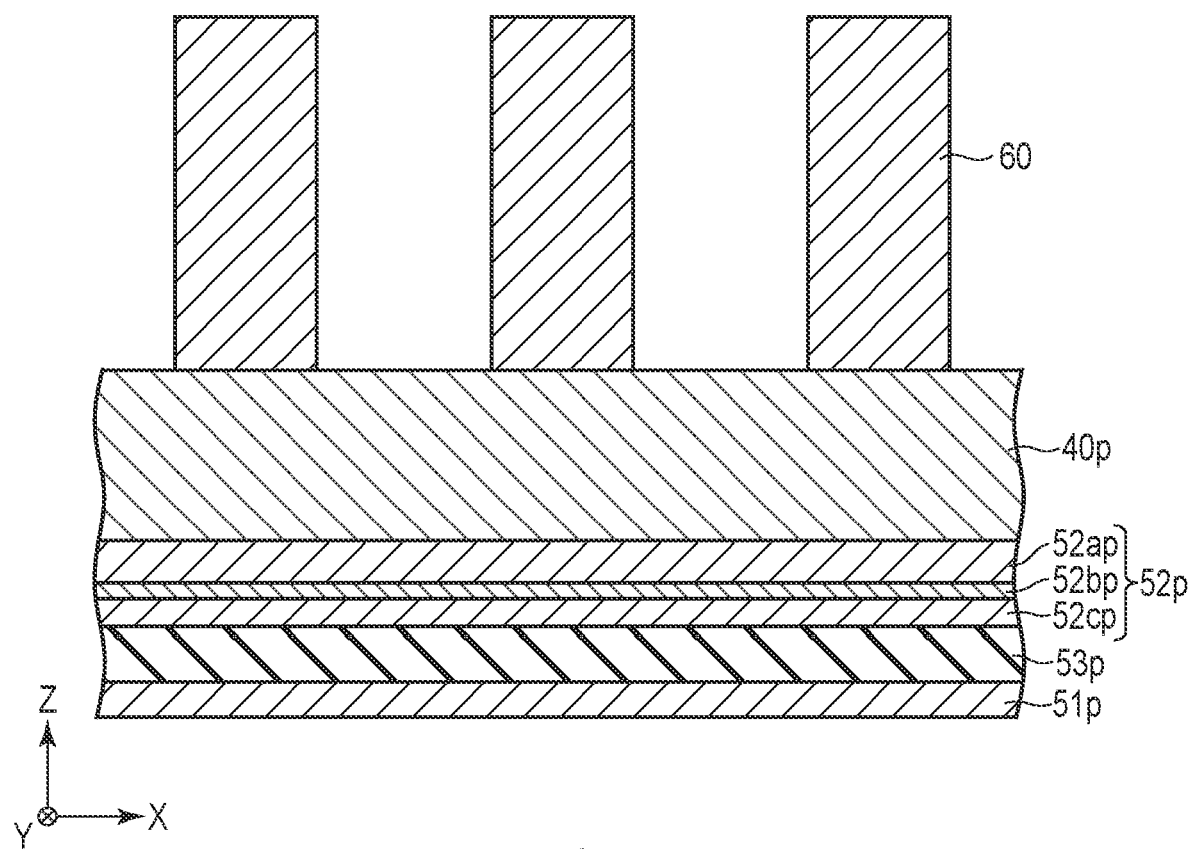
FIGS. 4, 5, 6 and 7 are each a cross-sectional diagram schematically illustrating a method of manufacturing the magnetic memory device of the embodiment.

First, as shown in FIG. 4, a stacked film is formed on a lower region (not shown) including a semiconductor substrate (not shown) and the like. More specifically, a bottom electrode layer 51p, a selector material layer 53p, a top electrode layer 52p and a magnetoresistance effect element layer 40p are formed. The top electrode layer 52p includes consists of a first portion layer 52ap, a second portion layer 52bp, and a third portion layer 52cp. Subsequently, on the magnetoresistance effect element layer 40p, a pattern of the hard mask layer 60 is formed.

Figure 5:
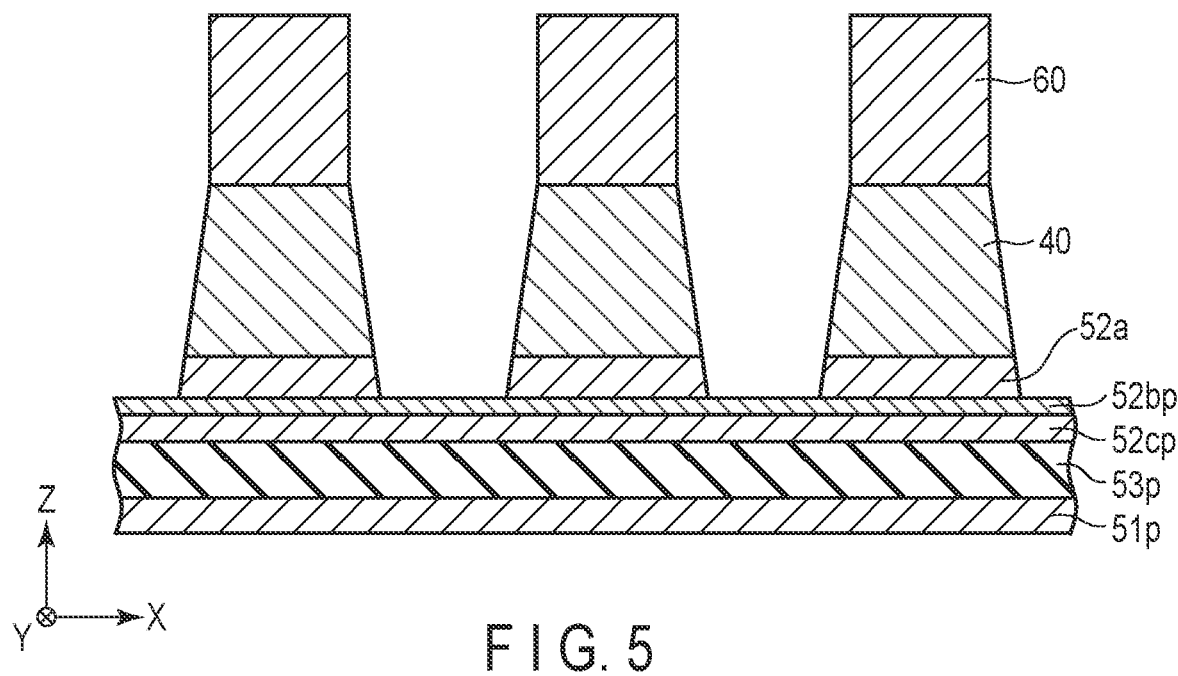

Next, as shown in FIG. 5, using the hard mask layer 60 as a mask, the magnetoresistance effect element layer 40p and the first portion layer 52ap are etched by the IBE. Note here that the magnetoresistance effect element contains magnetic elements such as iron (Fe) and cobalt (Co), and therefore it is difficult to perform precise etching by ordinary etching methods. Therefore, the IBE, a physical etching method, is employed. During the IBE, argon (Ar) ion beams are irradiated from an oblique direction while rotating the substrate. In this manner, the side surface of the magnetoresistance effect element. 40 and the side surface of the first portion 52a are inclined in a tapered manner.

As already mentioned, the etching rate of the second portion 52b with respect to the IBE is lower than the etching rate of the first portion 52a to the IBE. With this structure, the second portion layer 52bp functions as an etching stopper for IBE and the magnetoresistance effect element layer 40p and the first portion layer 52ap can be selectively etched.

Figure 6:
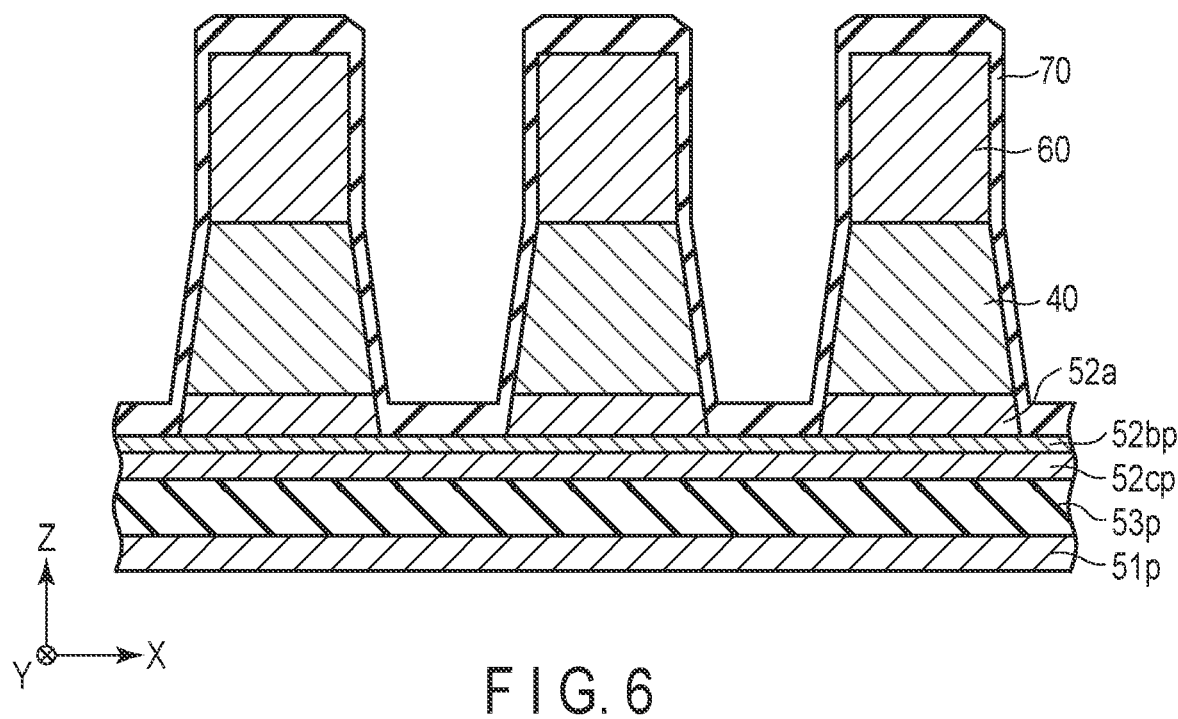

Next, as shown in FIG. 6, a silicon nitride layer is deposited as a protective insulating layer 70 on the surface of the structure obtained in the processing step of FIG. 5.

Figure 7:
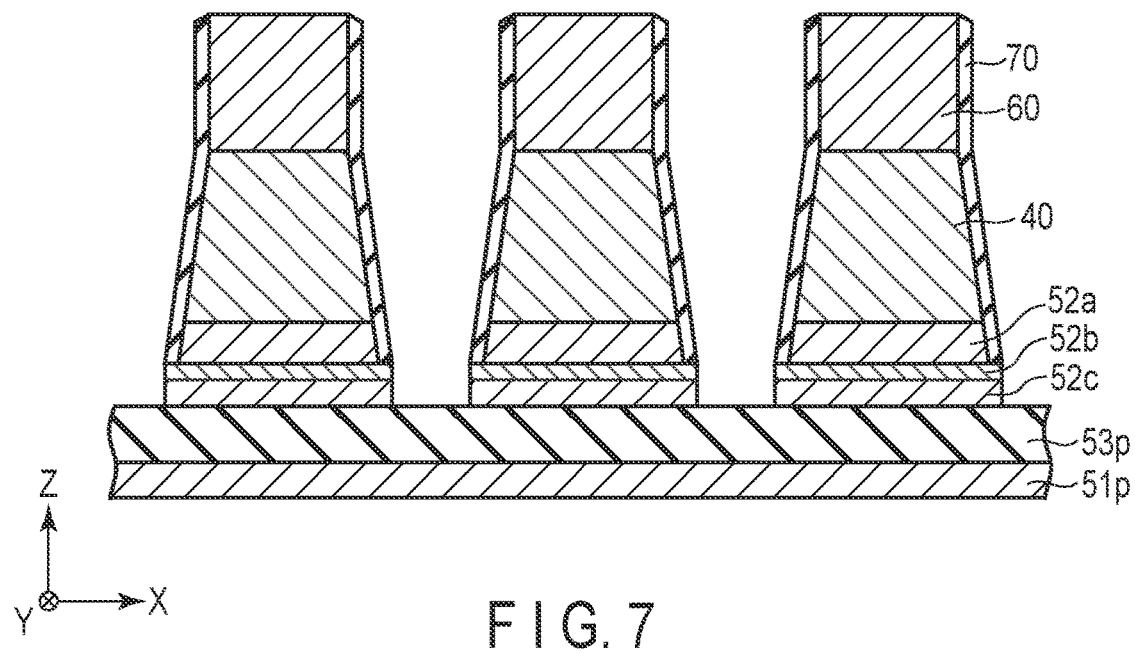

Next, as shown in FIG. 7, the protective insulating layer 70, the second portion layer 52bp and the third portion layer 52cp are etched by reactive ion etching (RIE). Thus, the patterns of the second portion 52b and the third portion 52c are obtained.

Further, as shown in FIG. 2, the selector material layer 53p and the bottom electrode layer 51p are etched by the RIE. Thus, the patterns of the selector material layer 53 and the bottom electrode 51 are obtained.

In the processing steps shown in FIGS. 7 and 2, the RIE is performed from the vertical direction. Therefore, the side surface of the second portion 52b, that of the third portion 52c, that of the selector material layer 53 and that of the bottom electrode 51 are formed vertical.

By the manufacturing method described above, the memory cells 30 as shown in FIG. 2 are formed.

As described above, in this embodiment, the top electrode 52 of the selector 50 includes the second portion 52b which has a low etching rate to IBE, and therefore an excellent magnetic memory device can be obtained, as will be described below.

Let us suppose here the case where the top electrode 52 does not include the second portion 52b. In this case, the selector material layer 53 may also be etched undesirably in addition to the top electrode 52 when forming the pattern of the magnetoresistance effect element 40 by the IBE. As a result, the selector material layer 53 may be damaged by the IBE, thereby degrading the characteristics and reliability of the selector 50.

In this embodiment, the etching rate of the second portion 52b with respect to the IBE is lower than the etching rate of the first portion 52a to the IBE. Therefore, when the pattern of the magnetoresistance effect element 40 is formed by the IBE, the second portion 52b functions as an etching stopper to IBE. As a result, it is possible to prevent the selector material layer 53 from being etched by IBE. Therefore, possible damage to the selector material layer 53 by IBE can be suppressed, and a magnetic memory device with excellent characteristics and reliability can be obtained.

Incidentally, in general, variations in the lithography process may cause variations in space width between adjacent memory cells 30. Variations in space width also cause variations in the formation of the pattern of the memory cells 30. For example, in a location where the space width is less, the etching depth is less as compared to a location where the space width is greater. Therefore, in locations where the space width is less, such a problem may occur that the bottom electrode 51 of the selector 50 cannot be separated between adjacent memory cells 30.

In order to reliably separate the bottom electrode 51 of the selector 50, the amount of etching by IBE should be increased to increase the space width. However, the increasing of the etching amount may causes damage by the IBE to the selector material layer 53.

By contrast, in this embodiment, the second portion 52b of the top electrode 52 of the selector 50 is used as an etching stopper, and the pattern of the magnetoresistance effect element 40 and the pattern of the first portion 52a of the top electrode 52 of the selector 50 are formed by etching with IBE. By using the second portion 52b as an etching stopper, the IBE can be carried out for a long time without causing the IBE damage to the selector material layer 53. Therefore, the space width between adjacent memory cells 30 can be increased. Thus, the bottom electrode 51 of the selector 50 can be reliably separated, and a magnetic memory device with excellent characteristics and reliability can be obtained.

Next, a modified example of the embodiment will be described with reference to a cross-sectional view shown in FIG. 8.

Figure 8:
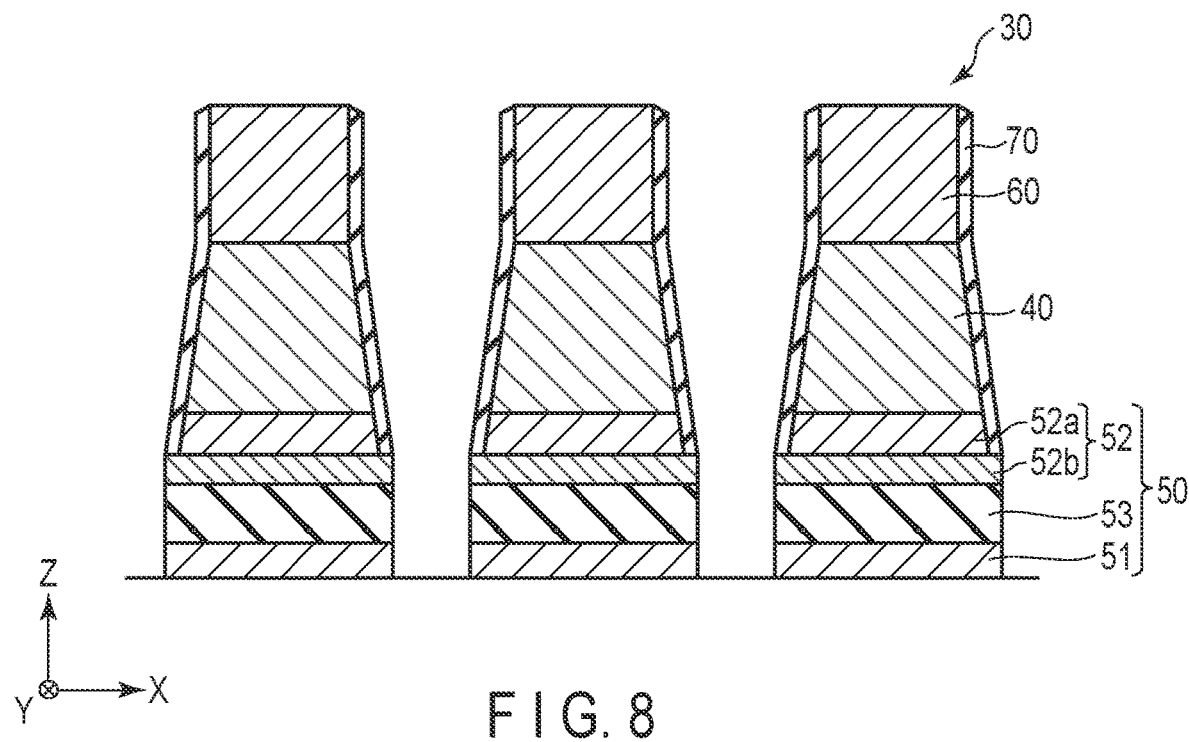
FIG. 8 is a cross-sectional view schematically illustrating a configuration of a modified example of a memory cell of the magnetic memory device according to an embodiment.

As shown in FIG. 8, in this modified example, the top electrode 52 of the selector 50 is formed from the first portion 52a and the second portion 52b provided on the lower layer side of the first portion 52a, and the third portion 52c is not provided on the lower layer side of the second portion 52b. The rest of the basic structure is similar to that of the embodiment described above.

In this modified example as well, when forming the pattern of the magnetoresistance effect element 40 by IBE, the second portion 52b functions as an etching stopper as in the embodiment described above. Therefore, advantageous effects similar to those of the embodiment described above can be obtained, and an excellent magnetic memory device can be obtained.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A magnetic memory device comprising a plurality of memory cells each including a magnetoresistance effect element and a switching element provided on a lower layer side of the magnetoresistance effect element and connected in series to the magnetoresistance effect element, wherein
the switching element includes a bottom electrode, a top electrode and a switching material layer provided between the bottom electrode and the top electrode,
the top electrode includes a first portion formed of a first material and a second portion provided on a lower layer side of the first portion and formed of a second material different from the first material,
each of the plurality of memory cells further includes a protective insulating layer which covers a side surface of the magnetoresistance effect element and a side surface of the first portion, and
the protective insulating layer does not cover a side surface of the second portion.

2. The device of claim 1, wherein
an etching rate of the second portion with respect to ion beam etching (IBE) is lower than an etching rate of the first portion with respect to the ion beam etching (IBE).

3. The device of claim 1, wherein
a hardness of the second material is higher than a hardness of the first material.

4. The device of claim 1, wherein
the second material is a material containing hafnium (Hf) and boron (B), a material containing tungsten (W), a material containing carbon (C), or a material containing titanium (Ti) and nitrogen (N).

5. The device of claim 1, wherein
the first material is a material containing silicon (Si), or a material containing hafnium (Hf).

6. The device of claim 1, wherein
the upper electrode further includes a third portion provided on a lower layer side of the second portion and formed of a third material different from the second material.

7. The device of claim 1, wherein
positions, in a height direction, of lower ends of the protective insulating layers included in the plurality of memory cells are aligned with each other.

8. The device of claim 1, wherein
a side surface of the first portion is inclined and a side surface of the second portion is vertical.

9. A magnetic memory device of comprising a plurality of memory cells each including a magnetoresistance effect element and a switching element provided on a lower layer side of the magnetoresistance effect element and connected in series to the magnetoresistance effect element, wherein the switching element includes a bottom electrode, a top electrode and a switching material layer provided between the bottom electrode and the top electrode, the top electrode includes a first portion formed of a first material and a second portion provided on a lower layer side of the first portion and formed of a second material different from the first material, each of the plurality of memory cells further includes a protective insulating layer which covers a side surface of the magnetoresistance effect element and a side surface of the first portion, and positions, in a height direction, of lower ends of the protective insulating layers included in the plurality of memory cells are aligned with each other.

10. The device of claim 9, wherein an etching rate of the second portion with respect to ion beam etching (IBE) is lower than an etching rate of the first portion with respect to the ion beam etching (IBE).

11. The device of claim 9, wherein
a hardness of the second material is higher than a hardness of the first material.

12. The device of claim 9, wherein
the second material is a material containing hafnium (Hf) and boron (B), a material containing tungsten (W), a material containing carbon (C), or a material containing titanium (Ti) and nitrogen (N).

13. The device of claim 9, wherein
the first material is a material containing silicon (Si), or a material containing hafnium (Hf).

14. The device of claim 9, wherein
the upper electrode further includes a third portion provided on a lower layer side of the second portion and formed of a third material different from the second material.

15. A magnetic memory device comprising a plurality of memory cells each including a magnetoresistance effect element and a switching element provided on a lower layer side of the magnetoresistance effect element and connected in series to the magnetoresistance effect element, wherein:

the switching element includes a bottom electrode, a top electrode and a switching material layer provided between the bottom electrode and the top electrode, the top electrode includes a first portion formed of a first material and a second portion provided on a lower layer side of the first portion and formed of a second material different from the first material, and a side surface of the first portion is inclined and a side surface of the second portion is vertical.

16. The device of claim 15, wherein
an etching rate of the second portion with respect to ion beam etching (IBE) is lower than an etching rate of the first portion with respect to the ion beam etching (IBE).

17. The device of claim 15, wherein
a hardness of the second material is higher than a hardness of the first material.

18. The device of claim 15, wherein
the second material is a material containing hafnium (Hf) and boron (B), a material containing tungsten (W), a material containing carbon (C), or a material containing titanium (Ti) and nitrogen (N).

19. The device of claim 15, wherein
the first material is a material containing silicon (Si), or a material containing hafnium (Hf).

20. The device of claim 15, wherein
the upper electrode further includes a third portion provided on a lower layer side of the second portion and formed of a third material different from the second material.

* * * * *